United States Patent Office 3,442,344
Patented May 6, 1969

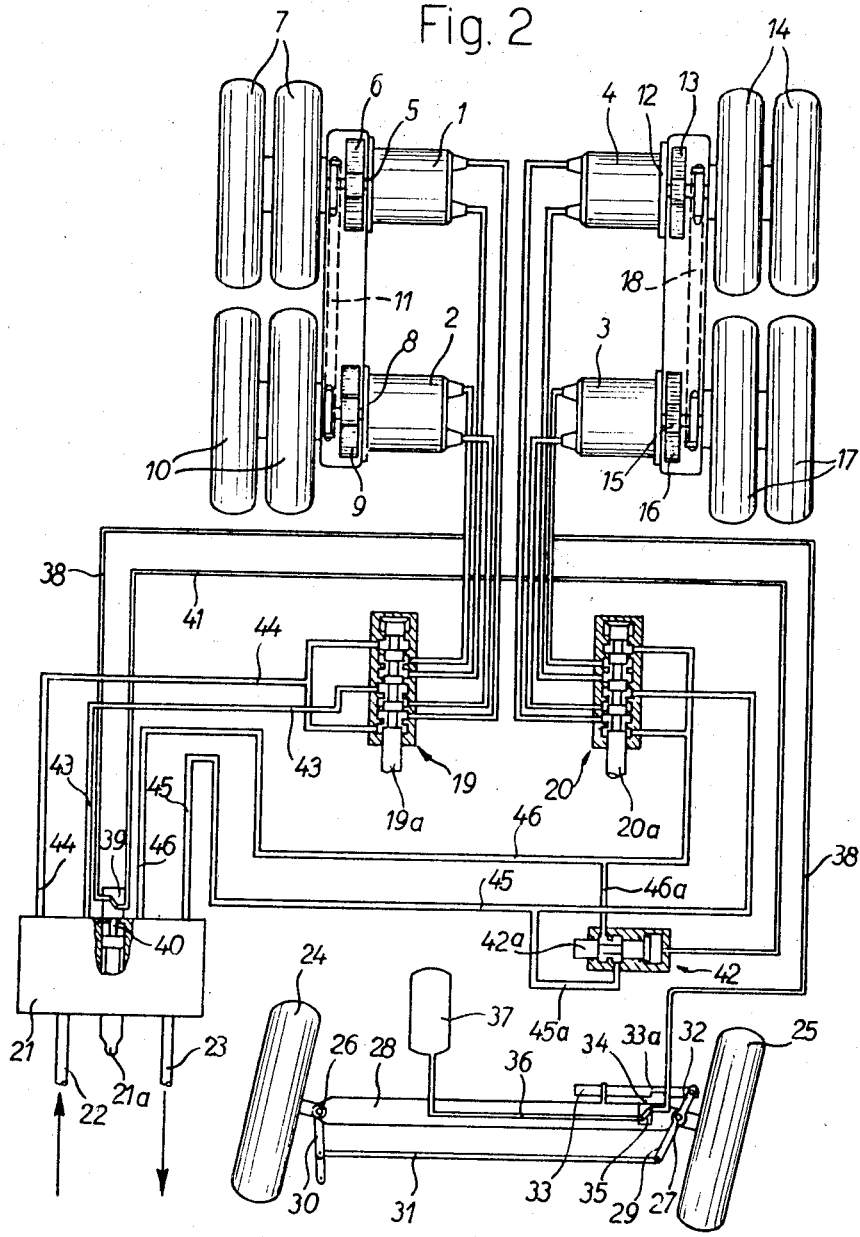

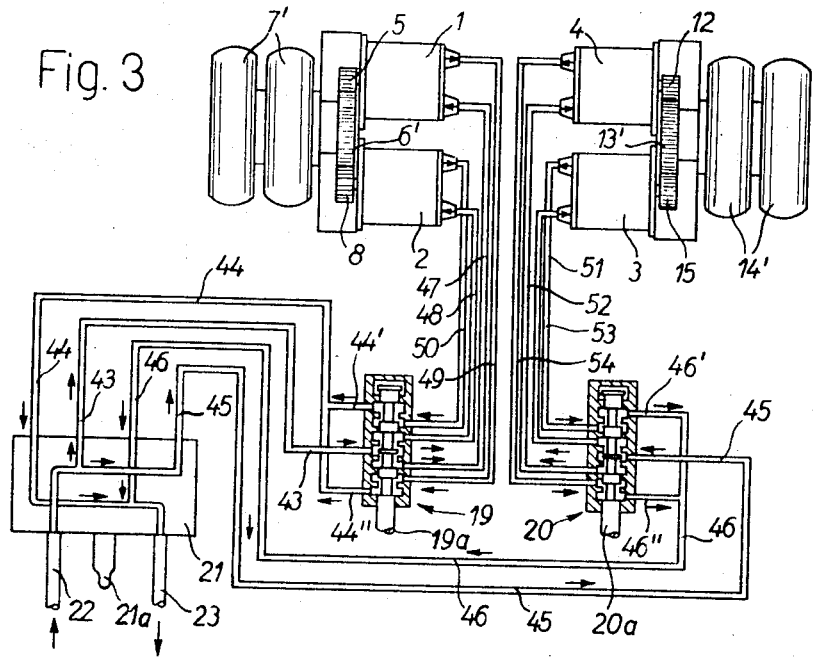
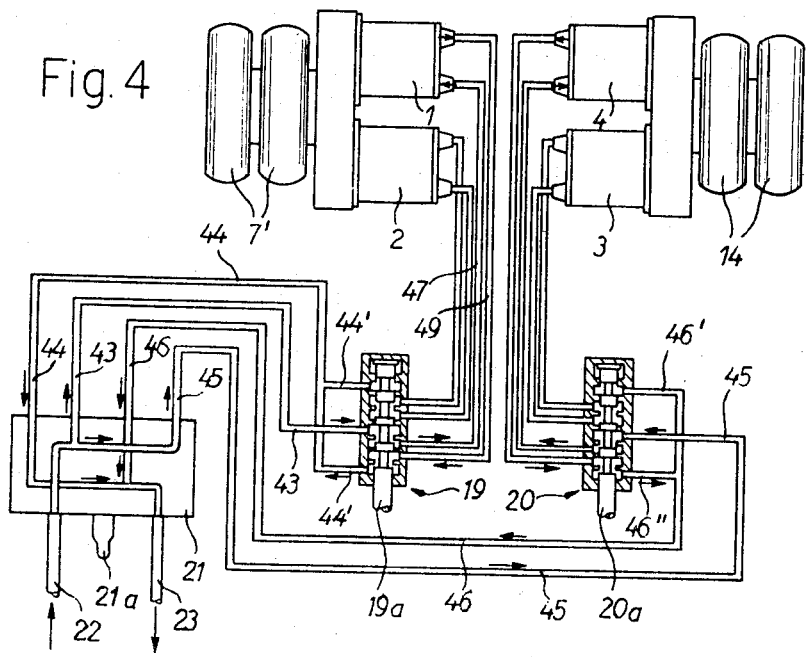

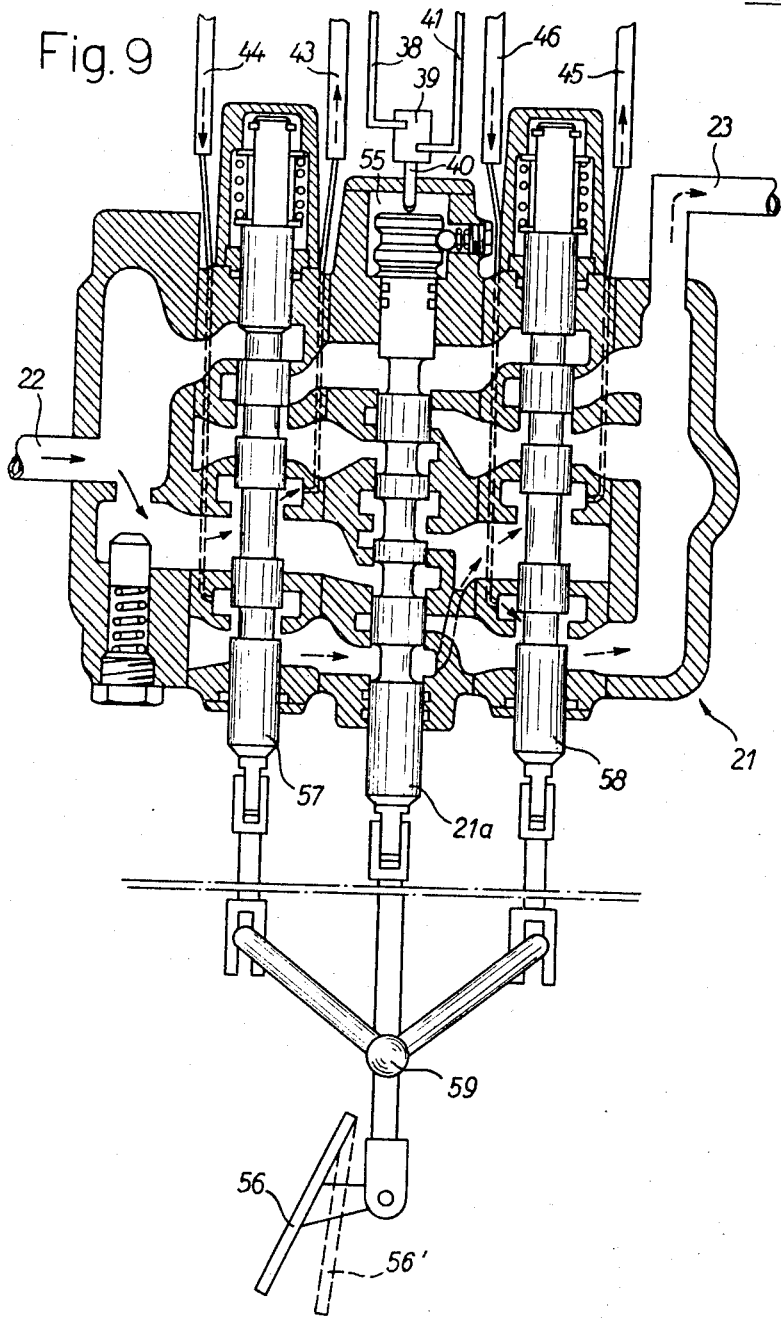

3,442,344
FLUID PRESSURE TRANSMISSIONS FOR
PROPELLING VEHICLES
Oreste Ocule, Grugliasco, Turin, Italy, assignor to Simit
Società per Azioni, Turin, Italy
Filed June 23, 1967, Ser. No. 648,420
Claims priority, application Italy, June 27, 1966,
15,089/66
Int. Cl. B62d 5/10
U.S. Cl. 180—6.3                               3 Claims

ABSTRACT OF THE DISCLOSURE

A fluid pressure transmission transmits motive power from a constant delivery source to respective sets of rotary fluid pressure motors connected to respective driving wheels. A distributor valve selectively connects these sets of motors in series or in parallel with the source to change the overall torque transmission ratio.

The invention relates to fluid pressure transmission for propelling vehicles.

The invention relates more particularly to such transmissions of the type comprising a fluid pressure source which delivers pressure fluid to a plurality of rotary fluid pressure motors adapted to drive the drivnng wheels of the vehicle.

In known transmissions of the above-mentioned type variation in the overall torque transmission ratio and, therefore, in the running speed of the vehicle is conventionally effected by varying the delivery pressure of the source, which usually comprises an engine-driven pump. This usually necessitates the use of variable displacement pumps of relatively complex and expensive construction.

This invention obviates the above drawback by providing a hydraulic transmission of the above-mentioned type which is relatively simple and rugged in construction, and which allows a vehicle to be driven at different speeds, while using a constant delivery source of fluid pressure.

According to the present invention in a broad aspect thereof there is provided a fluid pressure transmission comprising a constant-delivery fluid pressure source, at least two sets of rotary fluid pressure motors, each set being drivingly connected to a respective output shaft or group of interconnected output shafts adapted to be connected to a driving wheel or groups of driving wheels of a vehicle, and distributor means for changing as required the torque transmitted to said shafts by selectively connecting the sets of motors to the said source in series or in parallel.

Preferably the indiividual motors of each said set of motors are capable of driving alone the respective shaft or group of shafts at different respective speeds when connected to the said source, and in which there are provided further distributor means operable selectively to connect the source to different respective motors of each set or to connect all the motors of said set to the source in parallel to permit further variation of the torque transmitted to the said shafts. Two sets of motors are preferably provided, said sets being drivingly connected to output shafts or group of output shafts which are adapted to be connected to driving wheels or groups of driving wheels on opposite sides of a vehicle.

The invention also includes a transmission as defined above in combination with a vehicle steering including isolator means for automatically isolating the fluid pressure source from one of the two sets of motors when the steering mechanism is moved by a predetermined amount from its central or straight ahead position, said isolator means being operable only when the sets of motors are connected in series with the fluid pressure source.

The invention will be more particuarly described, by way of example only, with reference to the accompanying drawings, wherein:

FIGURE 2 is a view of the transmission of FIGURE 1 during negotiation of a curve;

FIGURES 3 to 8 are diagrammatic views of a transmission for a two-axle vehicle according to an alternative embodiment of the invention in six different respective settings corresponding to six different transmission ratios; and FIGURE 9 is a digrammatic sectional view of part of the transmission of FIGURES 1 and 2 and 3 to 8.

Figure 1:
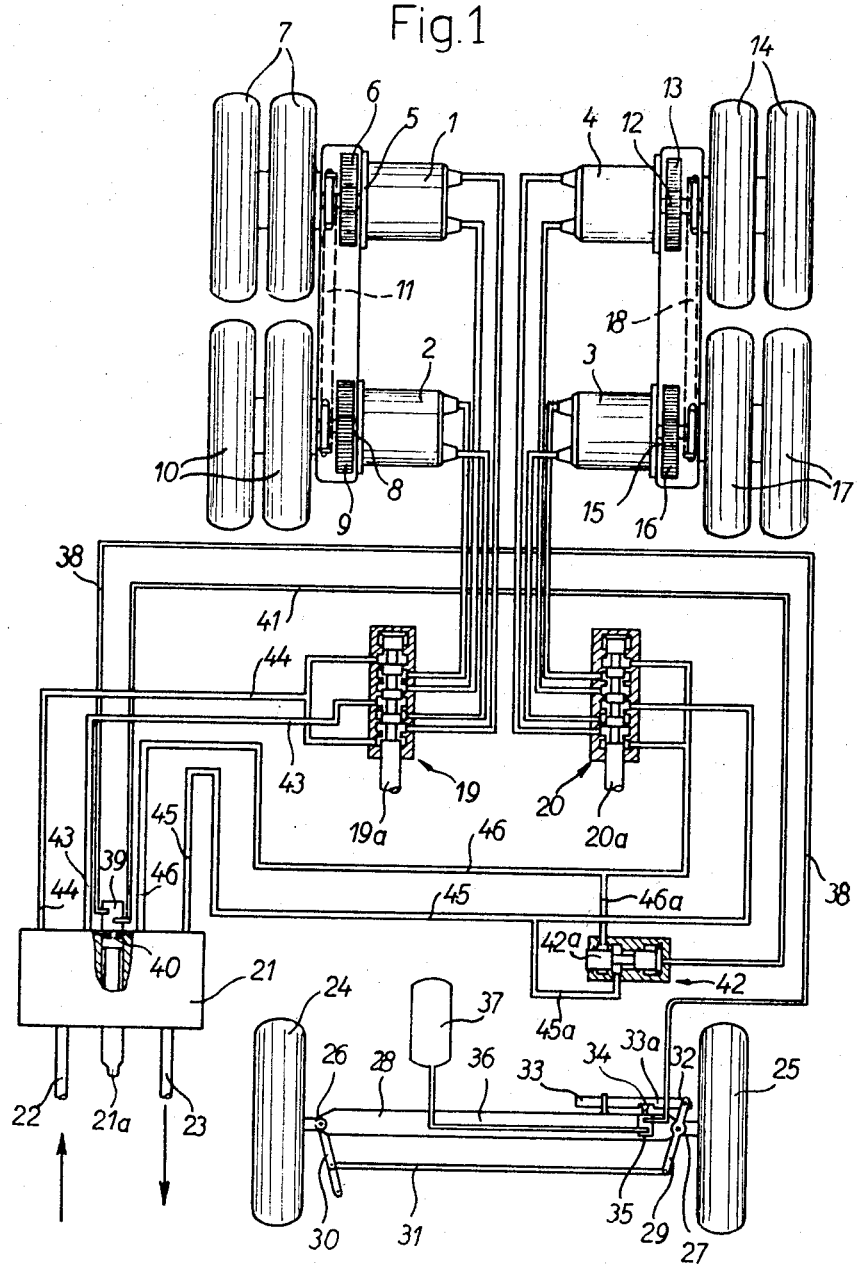
FIGURE 1 is a diagram of an hydraulic transmission for propelling a three-axle vehicle in accordance with one embodiment of the invention.
Figure 5:
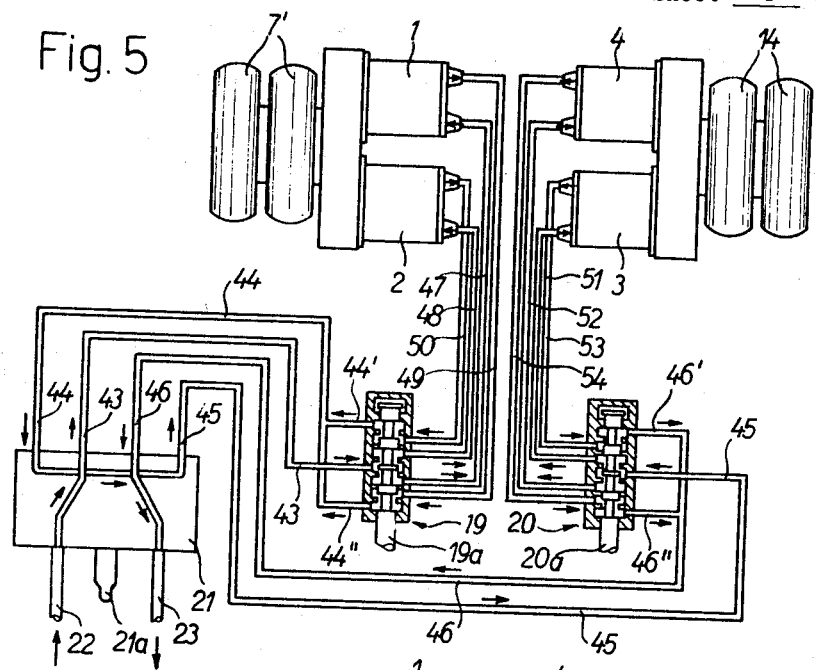
Figure 6:
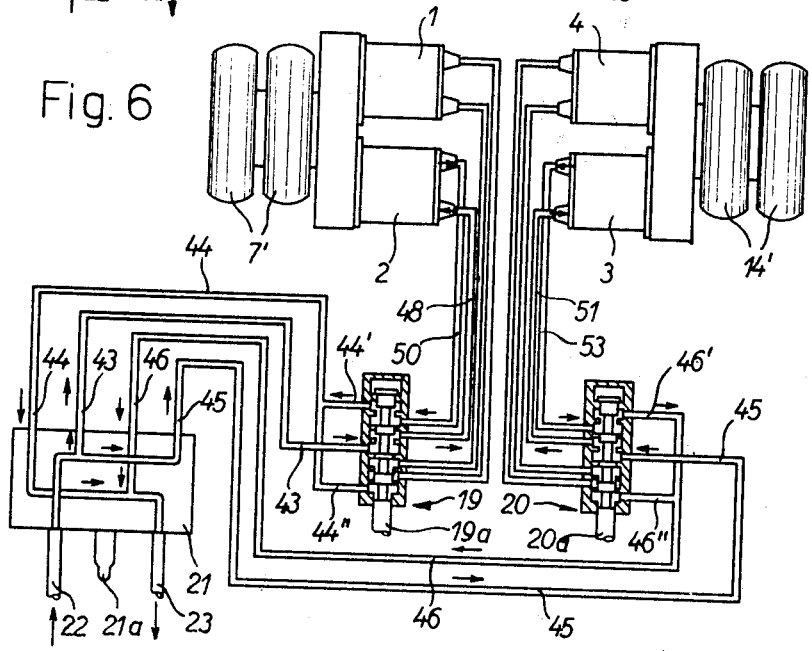

An hydraulic fluid transmission according to the invention is shown in FIGURES 1 and 2 applied to a three-axle vehicle and in FIGURES 3 to 8 applied to a two-axle vehicle: the basic configuration is the same in both embodiments, and corresponding reference numerals are used where appropriate.

Four fluid pressure rotary motors 1, 2, 3 and 4 are subdivided into two sets, namely motors 1 and 2, and motors 3 and 4. The two sets of motors 1 and 2, 3 and 4 drive the right-hand and left-hand driving wheels as viewed from the rear of the vehicle—that is from the top of each figure looking towards the bottom.

In a three-axle vehicle (FIGURES 1 and 2) the motors 1, 2 of one set are connected to a respective right-hand group of driving wheels 7, 10 by respective gear drives comprising respective pinions 5, 8 meshing with respective toothed wheels 6, 9 which are connected to the respective wheels 7, 10 by respective shafts (not shown). These shafts are interconnected by an endless roller chain 11, shown in broken lines.

Similarly, the left-hand set of motors 3, 4 drive respective pinions 12, 15 which mesh with respective toothed wheels 13, 16 connected to the respective driving wheels 14, 17 through respective shafts (not shown) which are interconnected by an endless roller chain 18, also shown in broken lines.

In FIGURES 1 and 2 the motors 1 and 2, 3 and 4 of each set differ in effective stroke, or cylinder sweep, more particularly, the motors 1 and 4 driving the rearmost pairs of wheels 7, 14 have equal effective strokes and the motors 2, 3 driving the front pairs of driving wheels 10, 17 also have equal effective strokes which, however, differ from those of the motors 1 and 4.

With a two-axle vehicle (FIGURES 3 to 8) each set of motors 1 and 2, 3 and 4 drives its respective driving wheels 7', 14' through respective gear drives comprising pinions 5 and 8, 12 and 15 respectively, the pinions 5 and 12 differing in diameter from the pinions 8 and 15. The pinions 5 and 8, 12 and 15 mesh with respective toothed wheels 6', 13' keyed to the shafts (not shown) of the driving wheels 7', 14' respectively.

Each motor 1, 2, 3, 4 is capable of driving alone its respective driving wheels 7', 14' at a different speed and, therefore, with a different torque, compared with the other motor of the same set, this difference arising either through a difference in the effective stroke or cylinder sweep of the motors 1 and 2, 3 and 4 of each set or by virtue of the different transmission ratio by which the motors 1 and 2, 3 and 4 of each set are connected with their respective wheels 7', 14'; said difference in transmitted speeds may, of course, arise from both these factors conjointly.

The remaining parts of the hydraulic transmission are the same in both FIGURES 1 and 2 and FIGURES 3 to 8, and the following description therefore applies to both embodiments.

Each of the four motors 1, 2, 3, 4 has a respective pair of pipes connected thereto, one being a fluid inlet and the other a fluid outlet. The four pipes from the two right-hand motors 1 and 2 are connected to an auxiliary distributor valve 19, while the four pipes from the left-hand motors 3 and 4 are connected to an auxiliary distributor valve 20. The distributor valves 19, 29 have respective axially movable spool valve members 19a, 20a which are movable into three different settings in which fluid pressure supplied to the distributor valves is connected to one of the motors 1, 4 of the respective set, the other motor 2, 3 of said set, or to both motors 1 and 2, 3 and 4 of said set respectively.

The auxiliary distributor valves 19, 20 are connected via respective pairs of conduits 43, 44 and 45, 46 with a main distributor 21. The distributor 21 has a central slidable spool valve member 21a and is connected by a pipe 22 to a pressure fluid supply and by a conduit 23 to a discharge sump (not shown). The pressure fluid supply comprises an engine-driven pump (not shown) driven at constant delivery pressure and speed.

As shown in FIGURE 9, the main distributor 21, known per se, comprises a plurality of chambers adapted to be differently interconnected by a set of three slidable spool valve members, the central one of which 21a is movable between two positions in which it respectively establishes connections for connecting the two auxiliary distributor valves 19, 20 in series and in parallel respectively with the pressure fluid supply pipe 22 and discharge conduit 23. The central spool valve member 21a is movable between said two positions by means of a pedal 56 which is shown in FIGURE 9 in full lines in its position corresponding to series connection and in broken lines at 56' in its position corresponding to parallel connection of the auxiliary distributor valves 19, 20.

The distributor 21 is further provided with two lateral spool valve members 57, 58 connected to a common lever 59; in one position of the lever 59 the valve members 57, 58 prevent fluid supply to the distributor valves 19, 20, thereby locking the driving wheels, while in another position forward drive and in a third position reverse drive of the driving wheels is effected, in a known manner.

Discharge pipes 44, 46 connect the respective distributor valves 19, 20 to the discharge conduit 23 via the main distributor 21, pressure fluid from the pipe 22 being supplied to the valves 19, 20 from the main distributor 21 through pipes 44, 45 respectively.

In order to drive the vehicle at different speeds, corresponding to the different gear ratios of a mechanical transmission, the fluid pressure supply is connected selectively to both motors 1 and 2, 3 and 4 of each set, or to one or other of the motors of each set, for both parallel- and series-connection of the two sets of motors, using the central spool valve member 21a and the two auxiliary spool valve members 19a, 20a independently so as to obtain six different effective overall transmission ratios, as described below.

In order to obtain the lowest speed, and highest output torque, corresponding to bottom gear in a mechanical transmission, the motors 1, 2, 3, 4 are connected according to FIGURE 3 which, together with FIGURES 4 to 8 (which illustrate the other transmission ratios), applies equally to the two-axle vehicle as shown and to the three-axle vehicle of FIGURES 1 and 2.

In the "bottom gear" setting of FIGURE 3 the main distributor 21 connects in parallel the supply for the two auxiliary distributor valves 19, 20, and in the latter the spool valve members 19a and 20a are disposed in intermediate positions, so that each distributor valve 19, 20 feeds in parallel the two motors (1 and 2, 3 and 4) of the respective set of motors associated therewith, through pipes 47 and 48, 51 and 52. Thus the four motors 1, 2, 3, 4 are fed in parallel with pressure fluid through the pipes 47, 48, 51, 52, the return flow being through pipes 49, 50, 53, 54.

Since the pump delivery is distributed over all four motors 1, 2, 3, 4 according to the ratio existing between the respective toothed wheels 6', 13' and pinions 5, 8, 15, 12 and according to the difference in effective strokes of the motors 1 and 2, 3 and 4 of the same set, it follows that each motor is fed with a proportion of the full delivery. An intermediate speed, between the speeds which each motor 1 or 2, 3 or 4 would impart to the wheels 7', 14' alone, is therefore given to each of the wheels 7', 14'.

In order to select the next highest transmission ratio, corresponding to "second gear," the setting of the main distributor 21 is unaltered while the two auxiliary distributor valve members 19a, 20a are retracted into their valve housings (FIGURE 4), thereby cutting off one motor (1 and 4) of each set. The motors 2 and 3 are thus fed alone, the two motors 2, 3 being connected in parallel with the pressure fluid delivery by the main distributor 21.

Consequently, the driving wheels 7', 14' are driven at a speed imparted by the motors 2 and 3 alone in accordance with the respective output gear transmission ratios and effective strokes associated with the respective motors.

In order to select the next highest transmission ratio, corresponding to "third gear," the main distributor 21 is operated (FIGURE 9) to connect the two auxiliary distributor valves 19, 20 in series, the valve members 19a, 20a of the latter being disposed in their intermediate positions. The two motors 1 and 2, 3 and 4 in each set are thus connected in parallel with each other, the two sets being in series with each other. Thus pressure fluid from the supply pipe 22 flows through the pipe 43 and reaches the distributor valve 19 from which it is conveyed in parallel to the two motors 1 and 2; the fluid then flows back through pipe 44 to the main distributor 21 and is conveyed from the latter through pipe 45 to the second distributor valve 20. The distributor valve 20 directs the fluid to the two motors 3, 4 in parallel, the fluid finally flowing back to the main distributor 21 through the pipe 46, and thence to the discharge conduit 23.

In order to select effectively "fourth gear" the main distributor 21 is reverted to the setting shown in FIGURES 3 and 4 in which it connects the two auxiliary distributor valves 19, 20 in parallel, the valve members 19a, 20a of the latter being extended (FIGURE 6), thereby cutting off the motors 1 and 4 and supplying only the motors 2 and 3. Thus the motors 2 and 3 are now connected in parallel with respect to the fluid pressure delivery and transmit to the wheels 7', 14' a speed depending upon their respective output gear transmission ratios and/or effective strokes.

Figure 7:
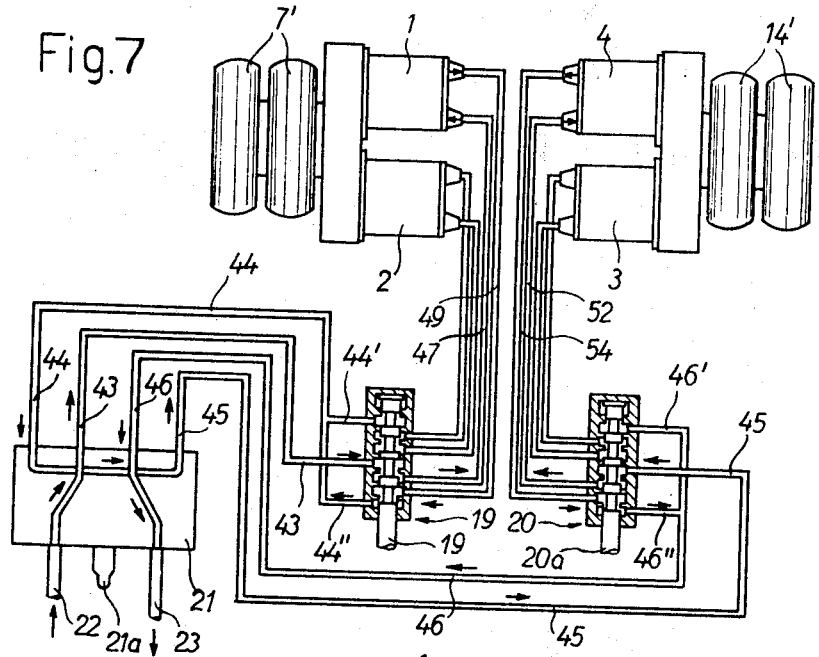

FIGURE 7 shows the settings for effectively a fifth gear." The main distributor 21 connects the two auxiliary distributor valves 19, 20 in series, the valve members 19a, 20a of the latter being fully retracted so as to connect to the fluid supply the motors 1 and 4 of each set and isolate the other two motors 2 and 3, so that the motors 1 and 4 are fed directly in series by the pump.

Figure 8:
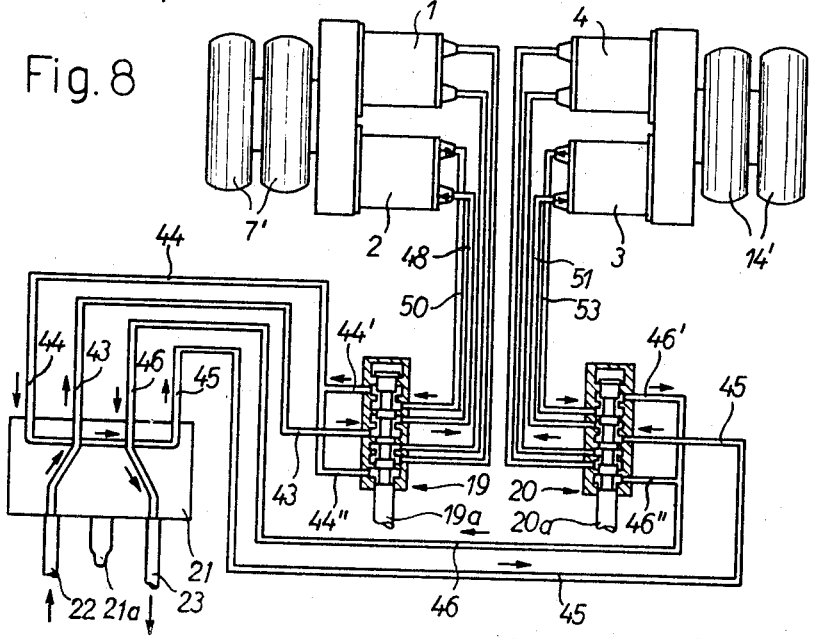

Finally, the highest transmission ratio, corresponding to a "sixth gear," is obtained as shown in FIGURE 8, where the main distributor 21 is arranged to connect in series the auxiliary distributor valves 19 and 20, the valve members 19a, 20a of the latter being fully extended. The motors 2 and 3 in each set are connected to the pressure fluid supply and the other two motors 1 and 4 are cut off. The two motors 2 and 3 are therefore series-connected and drive the wheels 7', 14' at speeds determined by their output gear transmission ratios and/or effective strokes.

The hydraulic transmission according to the invention is further provided with isolator means for automatically isolating one of the sets of motors when the vehicle is negotiating curves in order to compensate for the absence of a differential gear on the vehicle. Such isolation of one motor set is, of course, necessary only when the motors or motor sets are series-connected; without such isolation skidding of the wheels on the inside relative to those on the outside of the curve would occur. When the sets of motors are connected in parallel the two wheel sets can, however, rotate at different speeds, since the fluid pressure delivery to the two sets is then automatically balanced.

The isolator means is illustrated in FIGURES 1 and 2. An auxiliary fluid circuit (36, 38, 41) is provided including in series a compressed air reservoir 37, a first control valve 35, a second control valve 39 and a pneumatically operated isolator valve 42. The isolator valve 42 controls communication between two branch pipes 45a, 46a connected respectively to the delivery and exhaust pipes 45, 46 respectively of the distributor valve 20. The valve 42 is normally closed but is opened by the application of fluid pressure to the line 41.

The steering wheels 24, 25 of the vehicle are pivoted about vertical axes 26, 27 on a front axle 28. Each wheel 24, 25 carries an operating lever 29, 30, the levers 29, 30 being interconnected by a tie-bar 31. One operating lever 29 is provided with an extension 32 articulated to a slidable rod 33 extending parallel to the axle 28. The rod 32 is formed with a recess 33a having a cam surface which co-operates with a roller 34 carried by a movable member of the first control valve 35.

The second control valve 39 is associated with the main distributor 21 and is operated by a push rod 40 connected to the control valve member 21a (FIGURE 9). When the valve member 21a is in its lowermost position corresponding to parallel connection of the sets of motors, the second control valve 39 is closed: when, however, the valve member 21a is in its uppermost position, corresponding to series connection of the sets of motors, the valve 39 is open.

When the vehicle is moving in a straight line, with the steering wheels 24, 25 undeflected, as shown in FIGURE 1, the valve 35 is in its closed position. The fluid circuit to the valve 42 will therefore remain closed irrespective of whether the second control valve 39 is open or closed.

When, however, the vehicle negotiates a curve (FIGURE 2), the steering wheels 24, 25 rotate about their pivot axes 26, 27. When the wheels 24, 25 are moved by more than a predetermined amount, determined by the size of the recess 33a, the rod 33 is displaced to disengage the recess 33a from the operating roller 34 for the valve 35, so that the first control valve 35 is opened to let compressed air through.

If now the distributor 21 is arranged for series connection of the sets of motors, and the second control valve 39 opens, compressed air will be admitted to the isolator valve 42 and the latter will be opened, short circuiting the lines 45, 46 via the pipes 45a, 46a, and effectively isolating the left-hand motors 3, 4 of the vehicle.

On completion of the curve as the steering wheels 24, 25 are restored to their straight position the first control valve 35 opens and the compressed air circuit is cut out thereby restoring the transmission to its originally fully operational condition (FIGURE 1).

In addition to simplicity of construction and assembly the fluid pressure transmission according to the invention is relatively inexpensive in that it makes use of components of easy construction.

It will be understood that constructional details of the embodiments herein described may be widely varied without departing from the scope of the invention as defined in the appended claims.

I claim:
1. In a vehicle having respective driving wheels on opposite sides and a steering mechanism, a fluid pressure transmission comprising: a constant delivery fluid pressure source; at least two output drive means for connection to respective driving wheels of a vehicle; at least two sets of fluid pressure motors drivingly connected to respective said output drive means which are connected to said driving wheels on opposite respective sides of the vehicle, and including isolator means operative to isolate automatically the uflid pressure source from one of said two sets of motors when the steering mechanism is moved by a predetermined amount from its central, straight-ahead position, and means rendering the isolator means operable only when the sets of motors are connected in series with the fluid pressure source; and distributor means operative as required to connect the sets of motors to said source in series and in parallel selectively as required to change the torque transmitted to said output drive means.

2. In a vehicle, a fluid pressure transmission as claimed in claim 1 in which the isolator means include a fluid pressure operated isolator valve, a fluid pressure reservoir, a supply line through which fluid pressure is supplied from the reservoir to the isolator valve to operate the latter, and in which fluid pressure delivery and exhaust lines lead to the said one set of motors, the isolator valve when operated short-circuiting the said delivery and exhaust lines to isolate said set of motors.

3. In a vehicle, a fluid pressure transmission as claimed in claim 2 in which the said isolator valve supply line includes first and second control valves in series operatively connected to the steering mechanism and the distributor means of the transmission respectively, said control valves being open to supply fluid pressure to said isolator valve only when the steering mechanism is moved by said predetermined amount and the distributor means are operative to connect the sets of motors in series with the fluid pressure source.

References Cited

UNITED STATES PATENTS

| | | | |
|---|---|---|---|
| 2,060,220 | 11/1936 | Kennedy | 60—53 |
| 2,903,852 | 9/1959 | Bottoms | 60—53 |
| 2,949,971 | 8/1960 | Cline | 180—6.3 |
| 2,953,903 | 9/1960 | Skoog et al. | 60—53 |
| 3,246,715 | 4/1966 | Pool et al. | 180—6.3 |

BENJAMIN HERSH, *Primary Examiner.*

L. D. MORRIS, JR., *Assistant Examiner.*